(12) United States Patent
Kashima et al.

(10) Patent No.: US 6,459,569 B1
(45) Date of Patent: Oct. 1, 2002

(54) SWITCHGEAR

(75) Inventors: Junichi Kashima; Satoshi Mizuno; Yasubumi Mutoh, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/948,759

(22) Filed: Sep. 10, 2001

(30) Foreign Application Priority Data

Sep. 20, 2000 (JP) ........................................ 2000-290336

(51) Int. Cl.[7] ................................................ H02B 5/00
(52) U.S. Cl. ...................... 361/605; 361/603; 361/604; 361/612; 361/618; 361/620; 218/80; 218/90
(58) Field of Search ................................ 361/602–605, 361/612, 618, 619, 620, 621; 200/50.21, 50.23; 218/80, 90

(56) References Cited

U.S. PATENT DOCUMENTS

| | | | | |
|---|---|---|---|---|
| 3,894,204 A | * | 7/1975 | May et al. ................ | 200/50.23 |
| 4,744,002 A | * | 5/1988 | Nakano et al. ............ | 361/612 |
| 4,837,662 A | * | 6/1989 | Takeuchi et al. ........... | 361/618 |
| 5,001,599 A | * | 3/1991 | Itou et al. .................. | 361/604 |
| 5,898,565 A | * | 4/1999 | Yamauchi et al. .......... | 361/612 |

FOREIGN PATENT DOCUMENTS

| | | | | |
|---|---|---|---|---|
| JP | 61-1218 | | 1/1986 | |
| JP | 401286707 A | * | 11/1989 | ................ 361/612 |
| JP | 403215104 A | * | 9/1991 | ................ 361/618 |
| JP | 406054419 A | * | 2/1994 | ................ 218/89 |

* cited by examiner

Primary Examiner—Boris Chervinsky
(74) Attorney, Agent, or Firm—Dickstein Shapiro Morin & Oshinsky LLP

(57) ABSTRACT

The instrumentation transformers 6a to 6d and 7a to 7f for measuring the voltage of the main circuit are arranged within the container 15b located in the midst of the containers 15a to 15c. In the present invention, the containers 15a and 15b are linked by the insulating tube 21a and the primary-side lead lines 49 and 53 connected electrically to the primary-side terminal of the instrumentation transformers 6a and 7a are made routed from the container 15b through the insulating tube 21a to the container 15a, and the containers 15b and 15c are linked by the insulating tube 21b and the primary-side lead lines 51 and 55 connected electrically to the primary-side terminal of the instrumentation transformers 6d and 7e are made routed from the container 15b through the insulating tube 21b to the container 15c.

7 Claims, 7 Drawing Sheets

SWITCHGEAR

BACKGROUND OF THE INVENTION

The present invention relates to a substation component for the power generator installed in the power plants such as thermal electric power plants, nuclear power plants and hydro-electric power plants, especially to a switchgear installed on the main circuit from the generators to the transformers.

As for the switchgear installed on the main circuit from the generators to the transformers, for example, what is well known is disclosed in Japanese Patent Laid-Open Number 61-1218 (1986). The switchgear disclosed in this document is composed so that the components for the individual phases are separated and the switchgears are contained in the individual exterior covering, respectively. The upper-side of the exterior covering containing the switchgear is connected through the exterior covering containing the connecting bus tie to the exterior covering containing the disconnecting switch in step-wise configuration.

In this kind of conventional switchgear, the contact makers of the breaker part of the disconnecting switch are made contact to and leave from each other in responsive to the voltage value in the main circuit. In order to measure the voltage value in the main circuit, plural instrumentation transformers are installed at the switchgears. Those instrumentation transformers are installed in separate containers other than the containers containing the breaker part of the disconnecting switch.

In recent years, many efforts are made for integrating components into a unified and composite unit in order to downsize the switchgears and reduce their cost. Along with this trend, there arises strong request to accommodate plural instrumentation transformers in the container including the breaker part of the disconnecting switches. However, there are still unsolved problems regarding the method for the layout of plural instrumentation transformers in three containers arranged together.

SUMMARY OF THE INVENTION

A major object of the present invention is to provide a switchgear enabling to increase the working efficiency for the installation operation of the instrumentation transformers into the containers and the withdrawal operation of the instrumentation transformers from the containers.

The present invention is characterized by such an arrangement of plural instrumentation transformers for measuring the voltage in the main circuit as located within the container in the midst of containers arranged together.

According to the above described embodiment, as plural instrumentation transformers are arranged within the container located in the midst of the center among the containers arranged together, the installation operation of the instrumentation transformers into the containers and the withdrawal operation of the instrumentation transformers 6a to 6d from the containers may be applied only to the container 15b, and the installation and withdrawal operation at the other containers may be done simply by wiring the primary-side lead lines. Owing to this configuration, the work load and work time for the installation operation of the instrumentation transformers 6a to 6d into the containers and the withdrawal operation the instrumentation transformers 6a to 6d from the containers can be reduced to a large extent.

According to the present invention, it is easy to route the primary-side lead line of the instrumentation transformer from the container located a the center to the containers located at both ends. That is, in case that the instrumentation transformers are installed in the containers located at both ends, there occurs a part in which a couple of primary-side lead lines for the instrumentation transformers are required to be routed. As it is necessary to establish an enough insulation distance between two lead lines in this configuration, the structure of routing the primary-side lead lines may be complicated or the container may be upsized. In contrast, in this invention, as plural instrumentation transformers are arranged within the container located in the midst among the containers, the primary-side lead lines for the instrumentation transformers can be accommodated by a single cable extended from the container located in the midst to the containers located at both ends. Thus, it will be appreciated that the complexity in the routing configuration for the primary-side lead lines and the upsizing of the containers can be reduced.

A couple of coadjacent containers among three containers arranged together are linked by an insulating tube. The primary-side lead line of the instrumentation transformer corresponding to the phase for the containers located at both ends of three containers arranged together is made routed from the container located in the midst among three containers through the insulating tube to the corresponding container located at one of both ends of containers. The reason why the insulation tube is used for linking the containers is to prevent the cyclic current from flowing between the containers.

A breaker part of the disconnecting switch for disconnecting electrically the main circuit is installed at the individual containers arranged together. The breaker part is insulated by the insulating gas such as sulfur hexafluoride, and has a contact makers operated by the manipulator so as to contact to and leave from each other. A switching part of the disconnecting switch, a switching part of the earthing switch and an arrestor, connected electrically to the main circuit, are arranged in three containers arranged together, individually.

The height of the container located in the midst among three containers arranged together is made larger than the height of the other containers in order to establish an enough insulation distance between plural instrumentation transformers and the other components. The primary-side of plural instrumentation transformers is configured with open-delta connection or star connection. The plural instrumentation transformers are supported so as to be suspended down from the ceiling board installed above the container. The arresters are also supported so as to be suspended down from the ceiling board installed above the container.

DETAILED DESCRIPTION OF THE PREFERRED EMBODIMENTS

By referring to attached figures, the embodiment of the present invention is disclosed.

Figure 4:
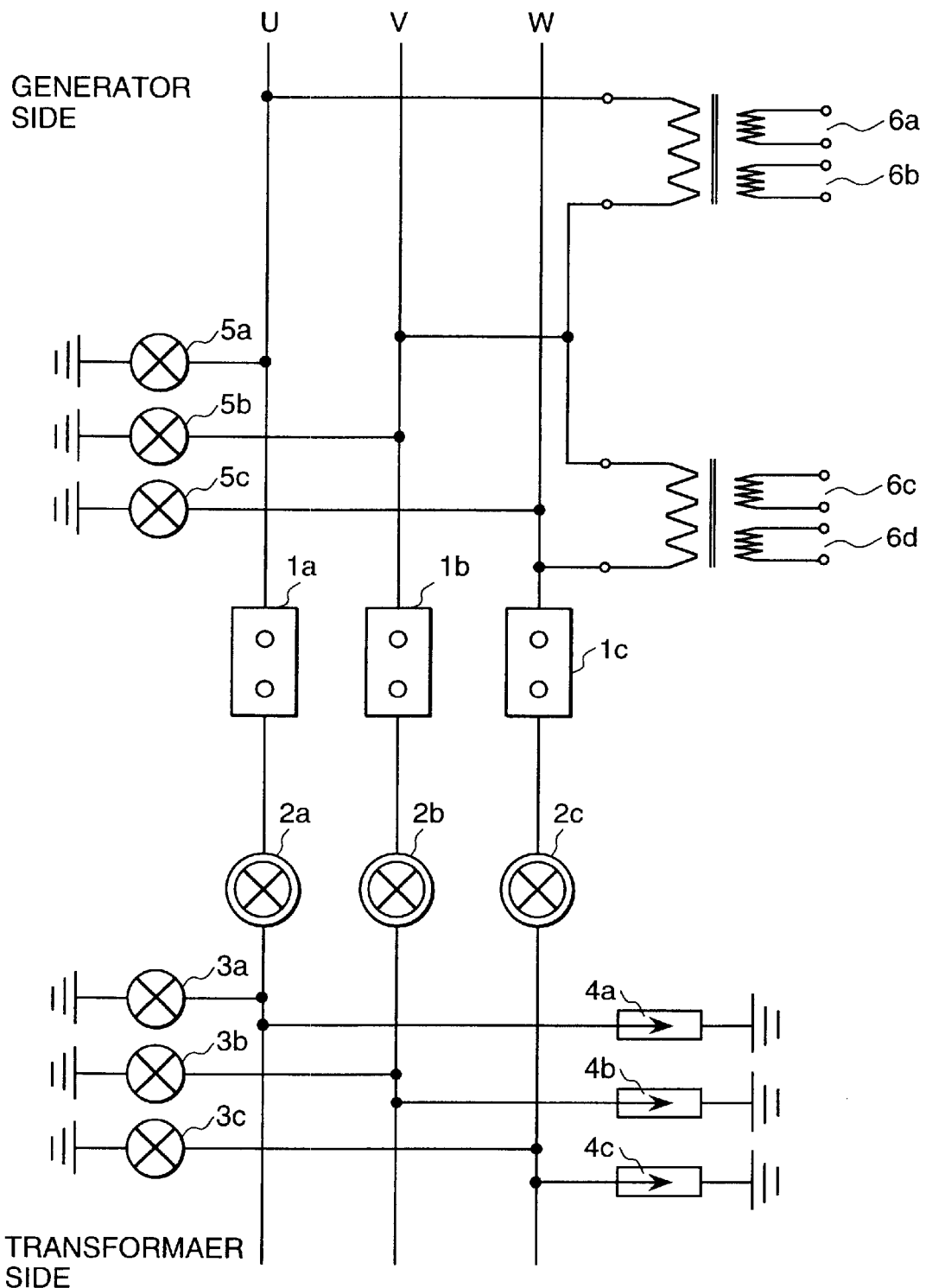
FIG. 4 is a three-phase connection diagram of the switchgear as the first embodiment of the present invention.

FIG. 4 shows a three-phase connection diagram of the switchgear in the first embodiment of the present invention. The switchgear of this embodiment is a substation component for the power generator installed in the power plants such as thermal electric power plants, nuclear power plants and hydro-electric power plants, which is used for breaking the heavy current in the main circuit from the power generator to the transformers. This switchgear comprises separated components for the individual phases, U-phase, V-phase and W-phase, respectively.

Incidentally, in the hypo-description, in case where the arrangements of the phases of three are the same, in order to avoid reduplicated description, any one of the phases of three (the U-phase in the hypo-description on the present embodiments) is typically explained. Corresponding reference characters of the other phases are shown in parenthesis, and the explanation of there arrangements is omitted.

A component 1a (1b, 1c) in the figure is a switchgear installed in the U-phase (V-phase, W-phase) circuit. The switchgear 1a (1b, 1c) is used for breaking electrically the current flow in the U-phase (V-phase, W-phase).

The disconnecting switch 2a (2b, 2c) is connected to the transformer side of the switchgear 1a (1b, 1c). The disconnecting switch 2a (2b, 2c) isolates electrically the U-phase circuit into the generator-side circuit and the transformer-side circuit. The generator-side circuit is a circuit located between the switchgear 1a (1b, 1c) and the power generator, and corresponds to the circuit including the switchgear 1a (1b, 1c). The transformer-side circuit is a circuit located between the switchgear 1a (1b, 1c) and the transformer, and corresponds to the circuit excluding the switchgear 1a (1b, 1c).

The earthing switch 3a (3b, 3c) and the arrester 4a (4b, 4c) are connected electrically to the transformer-side of the disconnecting switch 2a (2b, 2c). The earthing switch 3a (3b, 3c) is used for reducing the circuit voltage at the transformer-side down to the earthing electric potential and one of its terminal is grounded. The arrester 4a (4b, 4c) is used for regulating the overvoltage transferred to the circuit for U-phase (V-phase, W-phase), and its one terminal is grounded.

The earthing switch 5a (5b, 5c) is connected electrically to the transformer-side of the disconnecting switch 1a (1b, 1c). The earthing switch 5a (5b, 5c) is used for reducing the circuit voltage at the generator-side down to the earthing electric potential and one of its terminal is grounded.

One terminal of the primary side of the instrumentation transformer 6a is connected electrically to the generator-side of the disconnecting switch 1a. The other terminal of the primary side of the instrumentation transformer 6b and one of the primary side of the instrumentation transformer 6c are connected electrically to the generation-side of the disconnecting switch 1b. The other terminal of the primary side of the instrumentation transformer 6d is connected electrically to the generation-side of the disconnecting switch 1c.

The other terminal of the primary side of the instrumentation transformer 6a is connected electrically in series connection to one terminal of the primary side of the instrumentation transformer 6b. The other terminal of the primary side of the instrumentation transformer 6c is connected electrically in series connection to one terminal of the primary side of the instrumentation transformer 6d.

The instrumentation transformers 6a to 6d are used for measuring the circuit voltage of U-phase to W-phase, and are composed with open-delta connection.

Though not shown in this figure, a feeding disconnecting switch is connected electrically to the generator-side of the disconnecting switches 1a to 1c. The instrumentation transformers for the disconnecting switches 2a to 2c are connected to the transformer-side of the disconnecting switches 1a to 1c.

Figure 1:
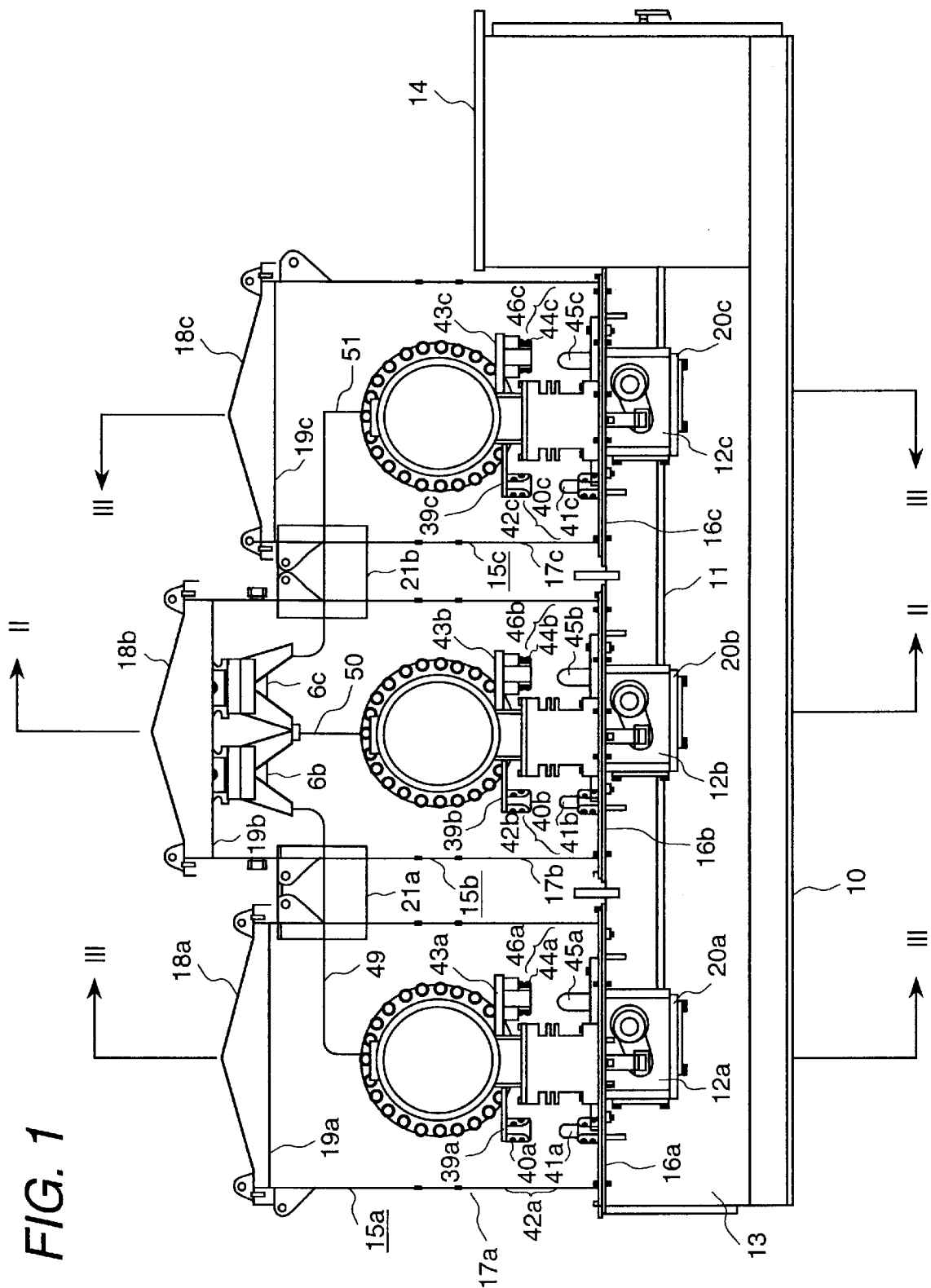
FIG. 1 is a cross-sectional drawing illustrating the structure of the switchgear as the first embodiment of the present invention.
Figure 2:
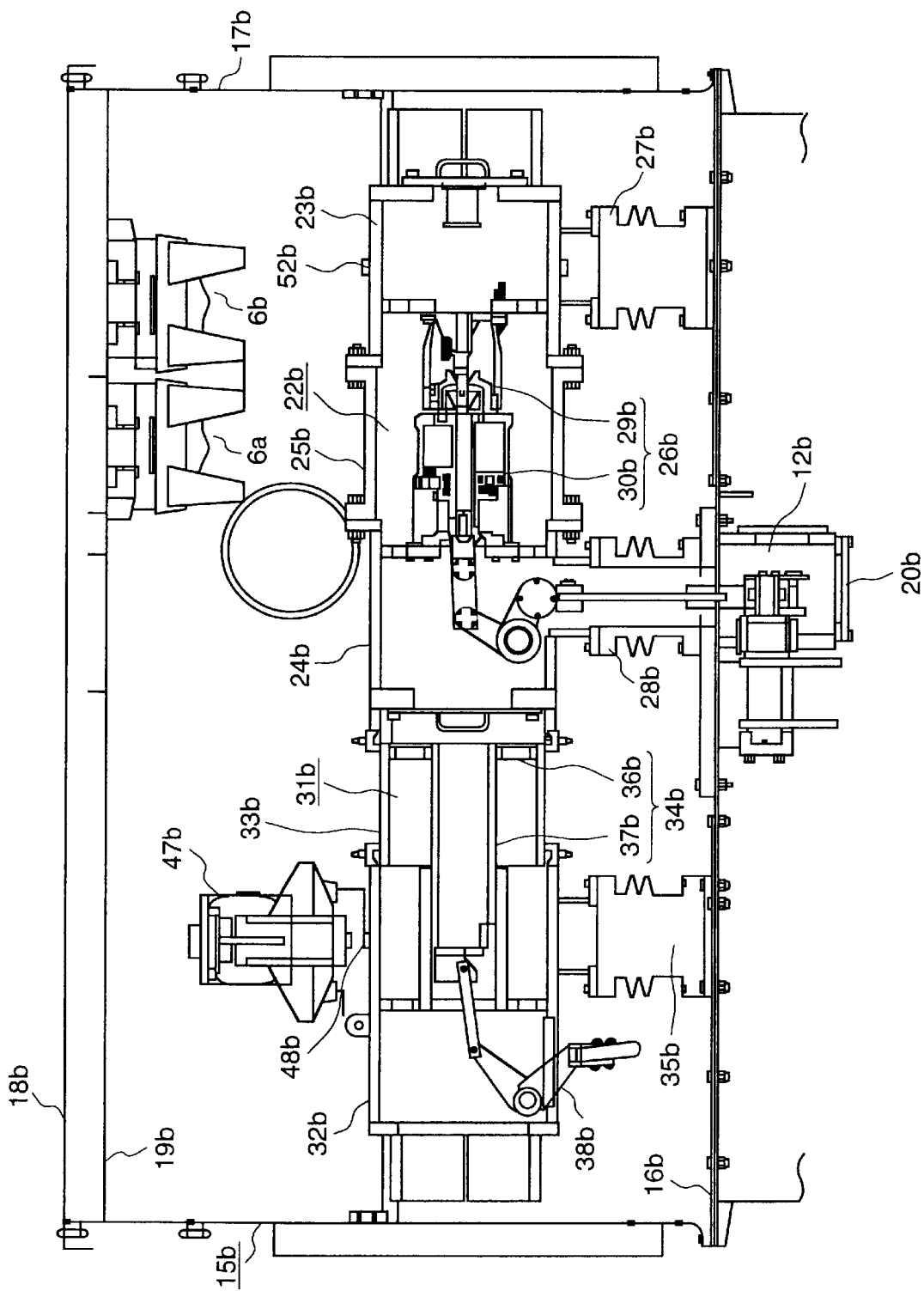
FIG. 2 is a cut-away drawing at the line II—II of FIG. 1.
Figure 3:
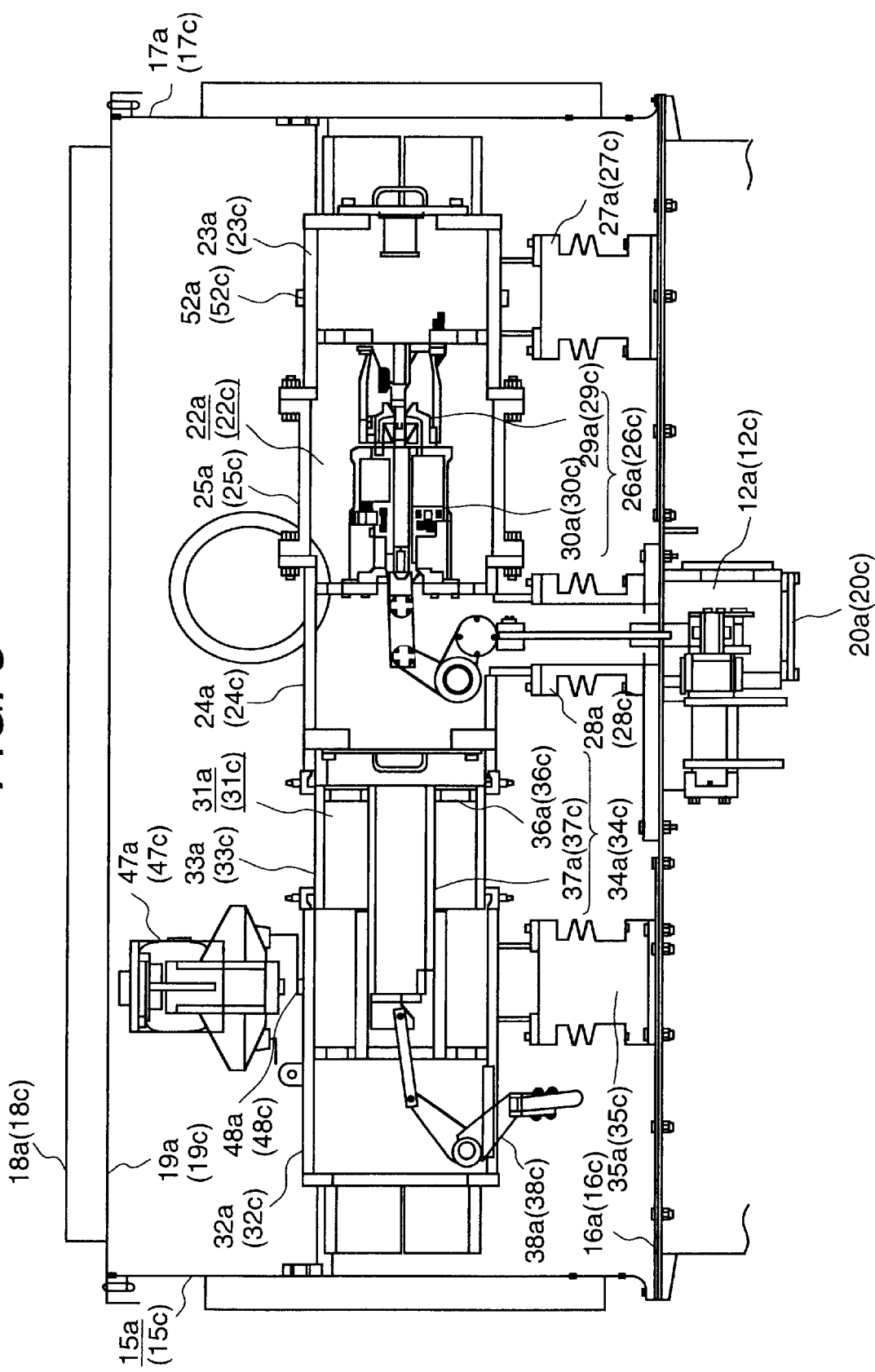
FIG. 3 is a cut-away drawing at the line III—III of FIG. 1.

FIGS. 1 to 3 illustrate the structure of the switchgear implemented with the three-phase connection diagram shown in FIG. 4. A component 10 in the figure is a base pedestal. A storage space is located above the base pedestal 10. Link mechanism parts 12a to 12c are contained in the storage space 13, which are connected mechanically through the coupling rod 11 to the manipulator (not shown). A manipulator box 14 is installed on the top and edge of the base pedestal 10 and at one end side of the storage space 13. The manipulator is used for making the contact makers of the disconnecting parts of the disconnecting switches 1a to 1c contacted and released on the block. The manipulator box 14 is taller than the storage space 13.

Containers 15a to 15c are arranged in the extended direction of the coupling rod 11 above the storage space 13. The width of the individual containers 15a to 15c is defined to be identical to each other, and the depth of the individual containers 15a to 15c is defined to be identical to each other. Its width is smaller than its depth. The width of the container is defined as the dimension of the container measured in the extended direction of the coupling rod 11. The depth of the container is defined as the dimension of the container measured in the vertical direction with respect to the extended direction of the coupling rod 11. The height of the container 15a is defined to be the same as the height of the container 15c. The height of the container 15b is defined to be higher than the height of the containers 15a and 15c.

The container 15a (15b, 15c) is composed of a base plate 16a 16b, 16c), a side wall 17a 17b, 17c) and a roof 18a 18b, 18c), and thus forms a gable-roof shaped box. The container 15a (15b, 15c) is made of metal, and made grounded. A gable-roof shape is such a shape of roof as a couple of plates are coupled to each other and as its side projection looks like "ヘ", one of Japanese Hiragana characters. A gable-roof shaped box means a box having a gable roof.

A ceiling board 19a (19b, 19c) is installed at the roof side 18a (18b, 18c) of the side wall 17a (17b, 17c). The ceiling board 19a (19b, 19c) is used for supporting the pendant instrument transformer and arrestor as described later. A container box 20a (20b, 20c) is installed below the under surface of the base plate 16a (16b, 16c). The container box 20a (20b, 20c) is used for containing the link mechanism 12a (12b, 12c) extended down below the base plate 16a (16b, 16c).

An insulating tube 21a for coupling between the container 15a and the container 15b is installed between the side wall 17a and the side wall 17b. An insulating tube 21b for coupling between the container 15b and the container 15c is installed between the side wall 17b and the side wall 17c. The insulating tubes 21a ad 21b are used as wiring ducts for routing the primary side lead wires for the instrumentation transformer to be described later, from the container 15b to the containers 15a and 15c.

The breaker part 22a (22b, 22c) of the disconnecting switch 1a (1b, 1c) is installed within the container 15a (15b, 15). The breaker part 22a (22b, 22c) is enclosed by the main circuit conductor 23a (23b, 23c), the main circuit conductor 24a (24b, 24c) and the insulating member 25a (25b, 25c), which is formed by arranging the switching mechanism part 26a (26b, 26c) at the part where the insulating gas such as sulfur hexafluoride (SF6) are filled.

The main circuit conductor 24a (24b, 24c) and the main circuit conductor 24a (24b, 24c) are cylindrical members having electric conductivity. The main circuit conductor 24a (24b, 24c) is insulated and supported by the insulating and supporting member 27a (27b, 27c) fixed at the base plate 16a (16b, 16c). The main circuit conductor 24a (24b, 24c) is insulated and supported by the insulating and supporting member 28a (28b, 28c) fixed at the base plate 16a (16b, 16c).

The insulating member 25a (25b, 25c) is a cylindrical member formed between the main circuit conductor 23a (23b, 23c) and the main circuit conductor 24a (24b, 24c), which is used for insulating electrically the main circuit conductor 23a (23b, 23c) from the main circuit conductor 24a (24b, 24c), and vice versa.

The switching mechanism part 26a (26b, 26c) is composed of the fixed switching mechanism part 29a (29b, 29c) and the movable switching mechanism part 30a (30b, 30c). The fixed switching mechanism part 29a (29b, 29c) is fixed on the surface of the flange standing out from the peripheral surface of the main circuit conductor 23a (23b, 23c) to its inside in the radial direction, and a stick and fixed contact maker is installed on its central axis. the movable switching mechanism part 30a (30b, 30c) is fixed on the surface of the flange standing out from the peripheral surface of the main circuit conductor 24a (24b, 24c) to its inside in the radial direction so as to face in an opposed position to the fixed switching mechanism part 29a (29b, 29c). At the center part of the movable switching mechanism part 30a (30b, 30c), a movable contact maker is installed so as to be enable to contact to and leave from the fixed contact maker of the fixed switching mechanism part 29a (29b, 29c).

One side of the link mechanism 12a (12b, 12c) is connected mechanically to the movable contact maker of the movable switching mechanism part 30a (30b, 30c) at its opposite side to the fixed switching mechanism part 29a (29b, 29c). The link mechanism 12a (12b, 12c) is formed as a unit of mechanical components coupled mechanically to one another such as insulating rod, revolving shaft lever and operation rod, which reaches the inside of the current-carrying conductor 24a (24b, 24c) from the inside of the container box 20a (20b, 20c) through the hollow part formed in the insulating and supporting member 28a (28b, 28c). Hexafluoride (SF6) gas as the insulating gas is filled in the hollow part of the insulating and supporting member 28a (28b, 28c) and the inside of the container box 20a (20b, 20c).

The switchgear 1a (1b, 1c) in this embodiment is configured as a puffer so that the arc generated when opening the movable contact maker from the fixed contact maker may be extinguished by spraying the compressed hexafluoride gas used as insulating material at the breaker part 22a (22b, 22c).

The switching part 31a (31b, 31c) of the disconnecting switch 2a (2b, 2c) is placed on the coaxial line shared by the breaker part 22a (22b, 22c) of the disconnecting switch 1a (1b, 1c). The switching part 31a (31b, 31c) is formed by arranging the switching mechanism part 34a (34b, 34c) at the area enclosed by the main circuit conductor 24a (24b, 24c), the main circuit conductor 32a (32b, 32c) and the insulating member 25a (25b, 25c). The switching mechanism part 34a (34b, 34c) is insulated by air not like the switching mechanism part 26a (26b, 26c) of the breaker part 22a (22b, 22c).

The main circuit conductor 32a (32b, 32c) is a conductive member shaped in a cylinder. The main circuit conductor 32a (32b, 32c) is insulated and supported by the insulation and supporting member 35a (35b, 35c) fixed at the base plate 16a (16b, 16c). The insulating member 33a (33b, 33c) is a member shaped in a cylinder installed between the main circuit conductor 24a (24b, 24c) and the main circuit conductor 32a (32b, 32c), and is used for insulating electrically between the main circuit conductor 24a (24b, 24c) and the main circuit conductor 32a (32b, 32c).

The switching mechanism part 34a (34b, 34c) is composed of the fixed switching mechanism part 36a (36b, 36c) and the movable switching mechanism part 37a (37b, 37c). The fixed switching mechanism part 36a (36b, 36c) is connected electrically to the main circuit conductor 24a (24b, 24c) and has a fixed contact maker. The movable switching mechanism part 37a (37b, 37c) is on the surface of the flange standing out from the peripheral surface of the main circuit conductor 32a (32b, 32c) to its inside in the radial direction so as to be opposed to the fixed switching mechanism part 36a (36b, 36c). The central part of the movable switching mechanism part 37a (37b, 37c) contains a movable contact maker configured so as to be enabled to contact to and leave from the fixed contact maker of the fixed switching mechanism part 36a (36b, 36c) in the horizontal direction.

One side of the link mechanism 38a (38b, 38c) is connected mechanically to the movable contact maker of the movable switching mechanism part 37a (37b, 37c) at its opposite side to the fixed switching mechanism part 38a (38b, 38c). The link mechanism 38a (38b, 38c) is formed as a unit of mechanical components coupled mechanically to one another such as insulating rod, revolving shaft lever and operation rod. The other side of the link mechanism 38a (38b, 38c) extends below the base plate 16a (16b, 16c), and is connected mechanically to the manipulator (not shown) for the disconnecting switch, contained in the container box 13.

The fixed contact maker 40a (40b, 40c) of the earthing switch 5a (5b, 5c) is connected electrically to the main circuit conductor 23a (23b, 23c) through the conductive member 39a (39b, 39c). The movable contact maker 41a (41b, 41c) installed so as to be enabled to contact to and leave from the fixed contact maker 40a (40b, 40c) is placed below the fixed contact maker 40a (40b, 40c) in the vertical direction and at the opposed position to the fixed contact maker 40a (40b, 40c). A pair of the fixed contact maker 40a (40b, 40c) and the movable contact maker 41a (41b, 41c) forms the switching part 42a (42b, 42c) of the earthing switch 5a (5b, 5c). The movable contact maker 41a (41b, 41c) is operated by the manipulator (not shown) for the earthing switch contained in the container box 13.

The fixed contact maker 44a (44b, 44c) of the feeding disconnecting switch is connected electrically to the main circuit conductor 23a (23b, 23c) through the conductive member 43a (43b, 43c). The movable contact maker 45a (45b, 45c) installed so as to be enabled to contact to and leave from the fixed contact maker 44a (44b, 44c) is placed below the fixed contact maker 44a (44b, 44c) in the vertical direction and at the opposed position to the fixed contact maker 44a (44b, 44c). A pair of the fixed contact maker 44a (44b, 44c) and the movable contact maker 45a (45b, 45c)

forms the switching part 46a (46b, 46c) of the feeding disconnecting switch. The movable contact maker 45a (45b, 45c) is operated by the manipulator (not shown) for the feeding disconnecting switch contained in the container box 13.

The fixed contact maker (not shown) of the earthing switch 3a (3b, 3c) is connected electrically to the main circuit conductor 32a (32b, 32c) through the conductive member (not shown). The movable contact maker (not shown) installed so as to be enabled to contact to and leave from the fixed contact maker is placed below the fixed contact maker in the vertical direction and at the opposed position to the fixed contact maker. A pair of the fixed contact maker and the movable contact maker forms the switching part of the earthing switch 3a (3b, 3c). The movable contact maker is operated by the manipulator (not shown) for the earthig switch contained in the container box 13.

At one side of the ceiling board 19a (19b, 19c) (at the side of the switching part 31a (31b, 31c) of the disconnecting switch 2a (2b, 2c)), the instrumentation transformer 47a (47b, 47c) and the arrester 4a (4b, 4c) are arranged along the line on which the containers 15a to 15c are installed. The instrumentation transformer 47a (47b, 47c) and the arrester 4a (4b, 4c) are supported so as to be suspended down from the ceiling board 19a (19b, 19c). The instrumentation transformer 47a (47b, 47c) is used for measuring the circuit voltage of U-phase (V-phase, W-phase) used for operating the switching part 33a (33b, 33c) of the disconnecting switch 2a (2b, 2c), and its primary lead line is connected electrically to the connector 48a (48b, 48c) formed at the main circuit conductor 32a (32b, 32c). The arrester 4a (4b, 4c) is used for regulating the overvoltage to be propagated to the circuit of U-phase (V-phase, W-phase).

The instrumentation transformers 6a to 6d are installed at the other side of the ceiling board 19b (at the side of the breaker part 1b of the switchgear 1b). The instrumentation transformers 6a to 6d are arranged lengthwise and breadthwise in two columns so as to be suspended from the ceiling board 19b. The instrumentation transformers 6a to 6d are used for measuring the circuit voltage of U-phase to W-phase to be used for operating the breaker part 22a (22b, 22c) of the disconnecting switch 1a (1b, 1c). The instrumentation transformers 6a to 6d are composed of the core part having the primary winding and the secondary winding and insulated by the insulating gas or the insulating oil, and four conductive terminals extending down below the core part and insulated by the insulating material such as epoxy resin. Two of four conductive terminals form the primary-side terminals and the rest of the conductive terminals form the secondary-side terminals.

The primary-side lead line 49 connected electrically to one side of the primary-side terminal of the instrumentation transformer 6a is routed from the inside of the container 15b through the insulating tube 21a to the inside of the container 15a, and is connected electrically to the terminal 52a installed in the main circuit conductor 23a. The other side of the primary-side terminal of the instrumentation transformer 6a and one side of the primary-side terminal of the instrumentation transformer 6b are connected electrically in series connection. Though not shown in the figure, the primary-side lead line 49 is supported by the insulating support member mounted at the ceiling board 19a.

The primary-side lead line 51 connected electrically to one side of the primary-side terminal of the instrumentation transformer 6d is routed from the inside of the container 15b through the insulating tube 21b to the inside of the container 15c, and is connected electrically to the terminal 52c installed in the main circuit conductor 23c. The other side of the primary-side terminal of the instrumentation transformer 6d and one side of the primary-side terminal of the instrumentation transformer 6c are connected electrically in series connection. Though not shown in the figure, the primary-side lead line 51 is supported by the insulating support member mounted at the ceiling board 19c.

The primary-side lead line 50 connected electrically to the other side of the primary-side terminal of the instrumentation transformer 6b and to one side of the primary-side terminal of the instrumentation transformer 6c is connected electrically to the terminal 52b installed in the main circuit conductor 23b. The secondary-side lead line (not shown) connected electrically to the secondary-side terminal of the instrumentation transformers 6a to 6d is connected electrically to the instrumentation device.

According to the above described embodiment, as the instrumentation transformers 6a to 6d are arranged within the container 15b which is located in the midst of the center among the containers 15a to 15c arranged together, the installation operation of the instrumentation transformers 6a to 6d into the containers and the withdrawal operation of the instrumentation transformers 6a to 6d from the containers may be applied only to the container 15b, and the installation and withdrawal operation at the other containers may be done simply by wiring the primary-side lead lines. Owing to this configuration, the work load and work time for the installation operation of the instrumentation transformers 6a to 6d into the containers and the withdrawal operation the instrumentation transformers 6a to 6d from the containers can be reduced to a large extent, which may leads to an increase in the working efficiency for the installation operation of the instrumentation transformers 6a to 6d into the containers and the withdrawal operation the instrumentation transformers 6a to 6d from the containers. Thus, the working efficiency for the assembly operation of the switchgear and the replacement operation of the instrumentation transformers 6a to 6d can be increased.

The installation operation of the instrumentation transformers 6a to 6d into the containers is performed as follows. At first, the instrumentation transformers 6a to 6d are made mounted on the ceiling board 19b. Next, the ceiling board 19b is made lifted by the crane, and mounted at the side wall 17b of the container 19b. Then, the wiring operation for the primary-side lead lines are performed for the containers 15a to 15c. The removal operation of the instrumentation transformers 6a to 6d from the containers is performed by applying the above installation procedures in reverse order.

According to this embodiment, the primary-side lead line 49 connected electrically to the primary-side terminal of the instrumentation transformer 6a and the primary-side lead line 51 connected electrically to the primary-side terminal of the instrumentation transformer 6d can be routed easily from the container 15b to the containers 15a and 15d. In case that the instrumentation transformers are installed within the containers 15a and 15c, there occurs such a part that a couple of primary-side lead lines connected electrically to the primary-side of the instrumentation transformer are required to be routed, which leads to increasing the complexity of cable routing or to upsizing the containers. In this embodiment, on the contrary, as the instrumentation transformers 6a to 6d are installed within the container 15b, a single cable routed from the container 15b to the containers 15a and 15c can accommodate the primary-side lead line 49 connected electrically to the primary-side terminal of the instrumentation transformer 6a and the primary-side lead line 51 connected electrically to the primary-side terminal of the instrumentation transformer 6d, which leads to reducing the complexity of cable routing or to downsizing the containers. Thus, the economical efficiency of the switchgear can be increased.

According to this embodiment, as the insulating tube 21a is linked between the container 15a and the container 15b and the insulating tube 21a is linked between the container 15b and the container 15c, cyclic currents do not flow among the containers. Owing to this configuration, it will be appreciated that the heat build-up at the containers 15a to 15c can be reduced. Thus, the safety of the switchgears can be increased.

Figure 7:
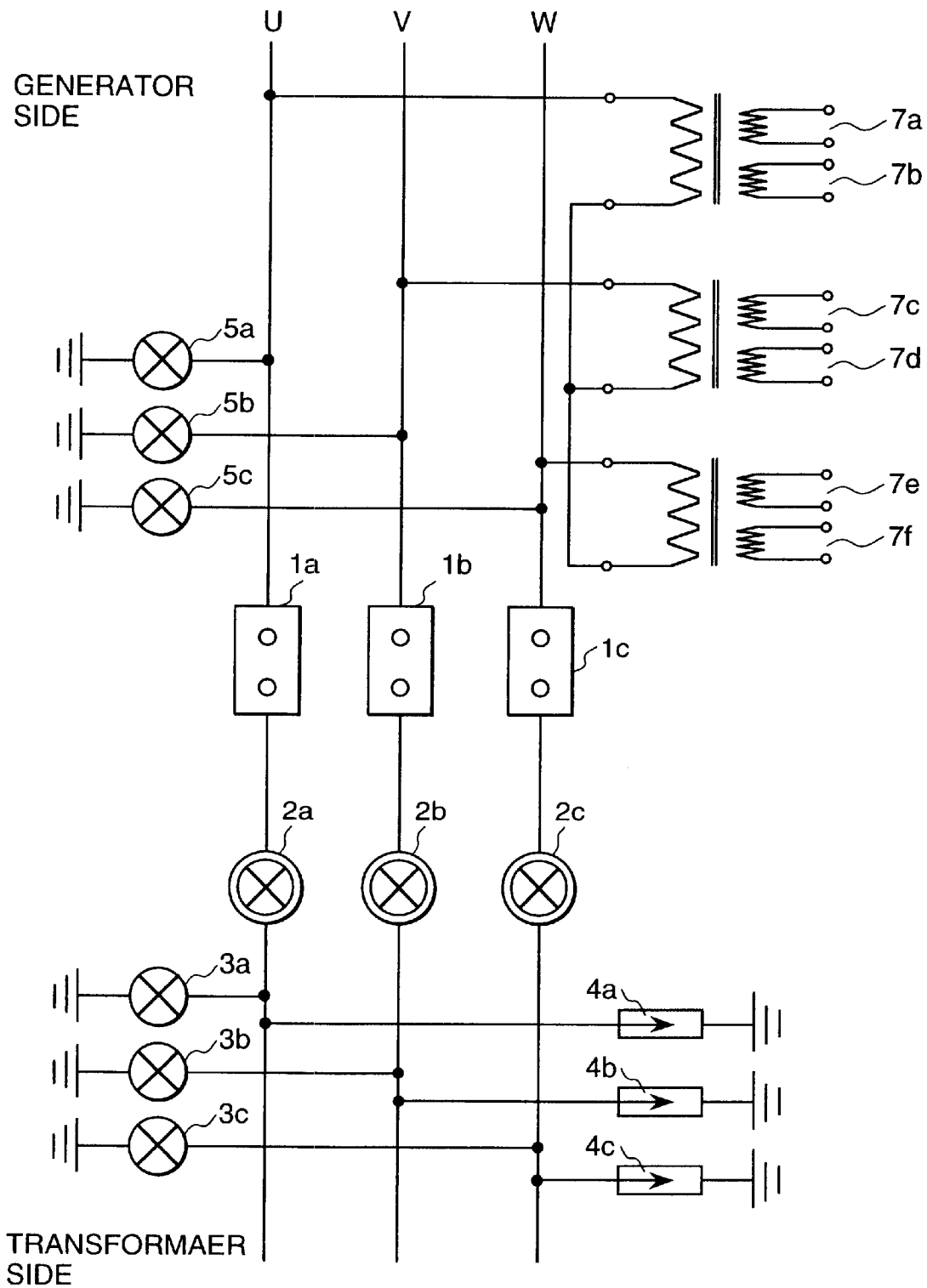
FIG. 7 is a three-phase connection diagram of the switchgear as the second embodiment of the present invention.

FIG. 7 shows a three-phase connection diagram of the switchgear in the second embodiment of the present invention. In this embodiment, the instrumentation transformers 7a to 7d are used for measuring the circuit voltage of U-phase to W-phase, and their primary-side is composed with star-connection. The component parts identical to those in the previous embodiment have like numbers and their detail description is not repeated here.

One terminal of the primary side of the instrumentation transformer 7a is connected electrically to the generator-side of the disconnecting switch 1a. One terminal of the primary side of the instrumentation transformer 6c is connected electrically to the generation-side of the disconnecting switch 1b. One terminal of the primary side of the instrumentation transformer 6e is connected electrically to the generation-side of the disconnecting switch 1c.

The other terminal of the primary side of instrumentation transformer 7a and one terminal of the primary side of the primary side of instrumentation transformer 7b are connected electrically in series. The other terminal of the primary side of instrumentation transformer 7c and one terminal of the primary side of the primary side of instrumentation transformer 7d are connected electrically in series. The other terminal of the primary side of instrumentation transformer 7e and one terminal of the primary side of the primary side of instrumentation transformer 7d are connected electrically in series. The other terminal of the primary side of instrumentation transformer 7b and the other terminal of the primary side of the primary side of instrumentation transformer 7d, and the other terminal of the primary side of the primary side of instrumentation transformer 7f are connected electrically in series.

Figure 5:
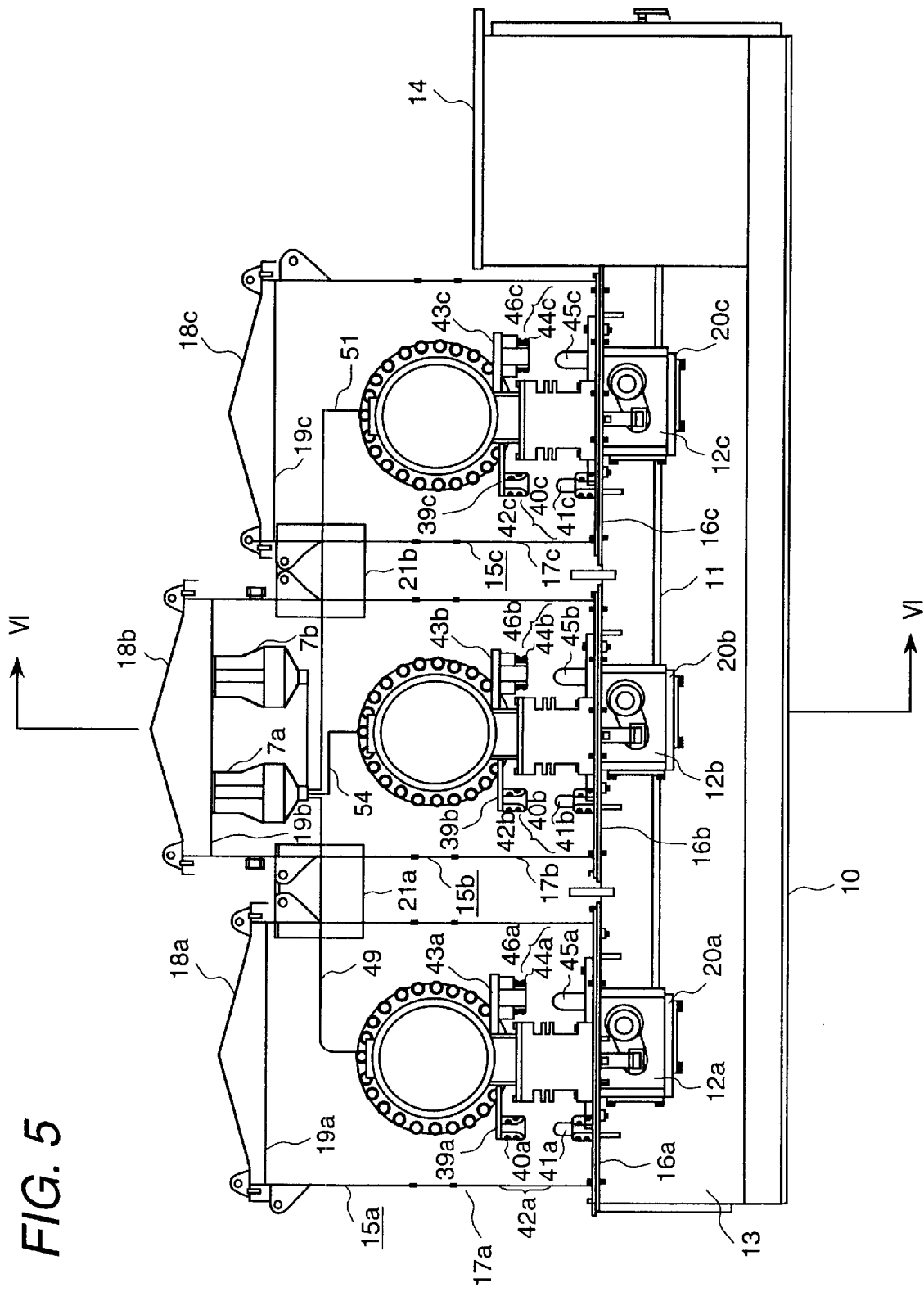
FIG. 5 is a cross-sectional drawing illustrating the structure of the switchgear as the second embodiment of the present invention.
Figure 6:
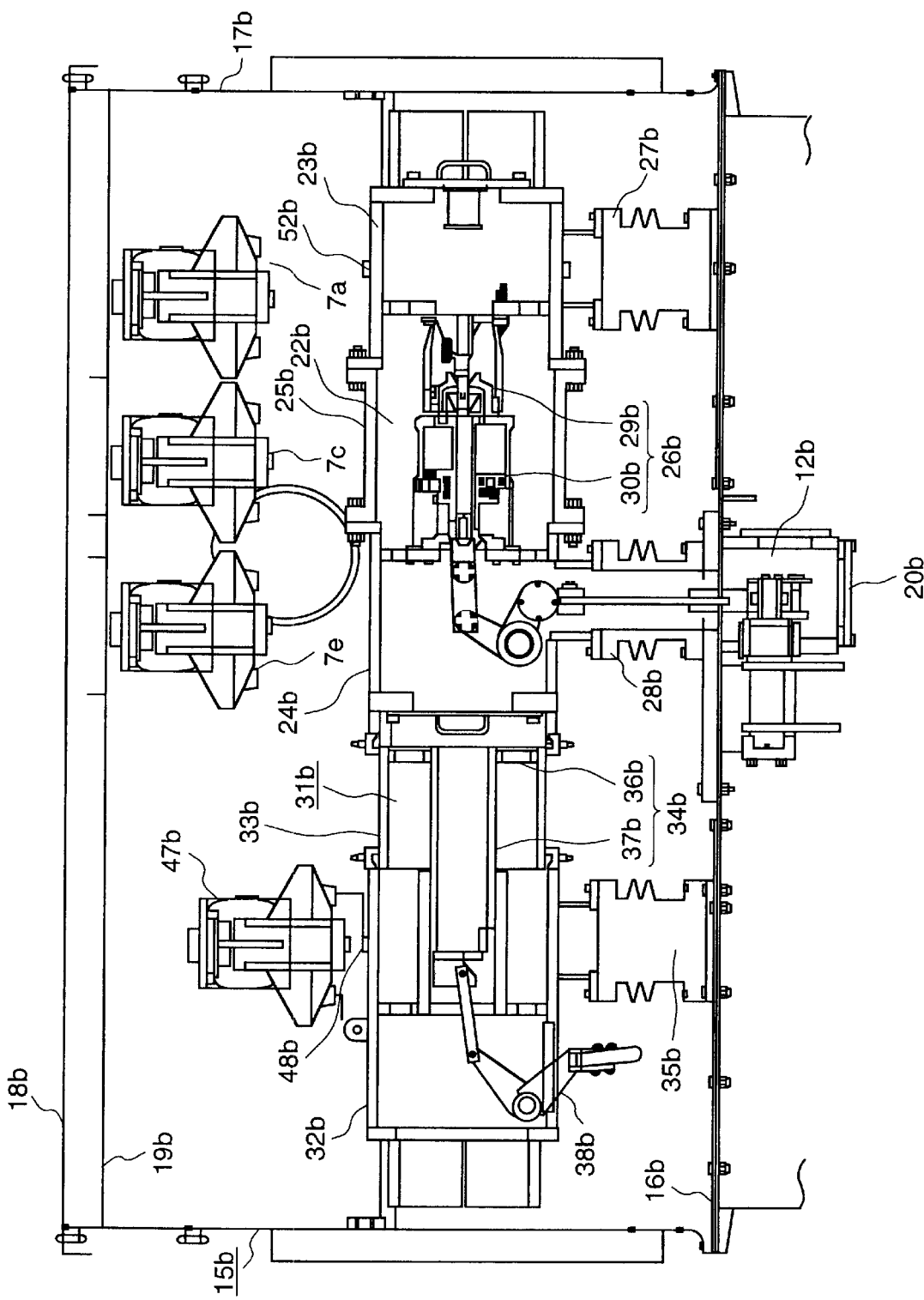
FIG. 6 is a cut-away drawing at the line III—III of FIG. 5.

FIG. 5 and FIG. 6 illustrate the structure of the switchgear implemented with the three-phase connection diagram shown in FIG. 7. The component parts identical to those in the previous embodiment have like numbers and their detail description is not repeated here. In this embodiment, as in the previous embodiment, the instrumentation transformers 7a to 7f are mounted at the other side (at the breaker part 22a side of the disconnecting switch 1a) of the ceiling board 19b within the container 15b.

The instrumentation transformers 7a to 7f are used for measuring the circuit voltage of U-phase to W-phase to be used for operating the breaker part 22a (22b, 22c) of the disconnecting switch 1a (1b, 1c), and are arranged in two columns lengthwise for the container 15d and in three columns breadthwise for the container 15 so as to be suspended from the ceiling board 19b. The instrumentation transformers 7a to 7d are composed of the core part having the primary winding and the secondary winding and insulated by the insulating gas or the insulating oil, and two conductive terminals (primary-side terminals) and two secondary-side terminals extending down below the core part and insulated by the insulating material such as epoxy resin.

The primary-side lead line 53 connected electrically to one side of the primary-side terminal of the instrumentation transformer 7a is routed from the inside of the container 15b through the insulating tube 21a to the inside of the container 15a, and is connected electrically to the terminal 52a installed in the main circuit conductor 23a. The other side of the primary-side terminal of the instrumentation transformer 7a and one side of the primary-side terminal of the instrumentation transformer 7b are connected electrically in series connection. Though not shown in the figure, the primary-side lead line 53 is supported by the insulating support member mounted at the ceiling board 19a.

The primary-side lead line 54 connected electrically to one side of the primary-side terminal of the instrumentation transformer 7c is connected electrically to the terminal 52b installed in the main circuit conductor 23b. The other terminal of the primary side of instrumentation transformer 7c and one terminal of the primary side of the primary side of instrumentation transformer 7d are connected electrically in series.

The primary-side lead line 55 connected electrically to one side of the primary-side terminal of the instrumentation transformer 7e is routed from the inside of the container 15b through the insulating tube 21b to the inside of the container 15c, and is connected electrically to the terminal 52c installed in the main circuit conductor 23c. The other side of the primary-side terminal of the instrumentation transformer 7e and one side of the primary-side terminal of the instrumentation transformer 7f are connected electrically in series connection. Though not shown in the figure, the primary-side lead line 55 is supported by the insulating support member mounted at the ceiling board 19c.

The other side of the primary-side terminal of the instrumentation transformer 7b the other side of the primary-side terminal of the instrumentation transformer 7d and the other side of the primary-side terminal of the instrumentation transformer 7f are connected electrically in series connection. The secondary-side lead line (not shown) connected electrically to the secondary-side terminal of the instrumentation transformers 6a to 6d is connected electrically to the instrumentation device.

According to the above described embodiment, as the instrumentation transformers 7a to 7f are arranged within the container 15b which is in the midst of the center among the container 15a to 15c, the working efficiency for the installation operation of the instrumentation transformers 7a to 7f into the containers and the withdrawal operation of the instrumentation transformers 7a to 7f from the containers may be increased. Thus, the working efficiency for the assembly operation of the switchgear and the replacement operation of the instrumentation transformers 7a to 7f can be increased.

In addition, according to this embodiment, as the instrumentation transformers 7a to 7f are installed within the container 15b, a single cable routed from the container 15b to the containers 15a and 15c can accommodate the primary-side lead line 53 connected electrically to the primary-side terminal of the instrumentation transformer 7a and the primary-side lead line 55 connected electrically to the primary-side terminal of the instrumentation transformer 6e, which leads to reducing the complexity of cable routing or to downsizing the containers. Thus, the economical efficiency of the switchgear can be increased.

According to the present invention, as the working load and working time for the installation operation of the instrumentation transformers into the containers and the withdrawal operation of the instrumentation transformers from the containers can be reduced to a large extent, the working efficiency for the installation operation of the instrumentation transformers into the containers and the withdrawal operation of the instrumentation transformers from the containers can be increased. Thus, the working efficiency for the assembly operation of the switchgear and the replacement operation of the instrumentation transformers can be increased. In addition, according to the present invention, as the complexity of cable routing or the upsizing of the containers can be reduced, the economical efficiency of the switchgear can be increased. The routing of the primary-side lead lines of the instrumentation transformers can be accommodated in a single cable independently upon the connection method for the primary-side lead lines of the instrumentation transformers.

What is claimed is:

1. A switchgear installed in a main circuit from a power generator to a transformer and structured in a phase-separation configuration, comprising three containers arranged together;

a disconnecting switch having a breaker part disconnecting said main circuit electrically and insulated by an insulating gas, said breaker part arranged in each of said three containers, and a manipulator for making contact to and leaving from a contact maker of said breaker part; and plural instrumentation transformers for measuring a voltage of said main circuit, wherein said plural instrumentation transformers are installed in a container located in a midst among said three containers.

2. A switchgear installed in a main circuit from a power generator to a transformer and structured in a phase-separation configuration, comprising three containers arranged together;

a disconnecting switch having a breaker part disconnecting said main circuit electrically and insulated by an insulating gas, said breaker part arranged in each of said three containers, and a manipulator for making contact to and leaving from a contact maker of said breaker part; and plural instrumentation transformers for measuring a voltage of said main circuit, wherein a couple of coadjacent containers among said three containers are linked by an insulating tube;

said plural instrumentation transformers are installed inside a container located in amidst among said three containers;

a primary-side lead line for an instrumentation transformer corresponding to a phase for a container located in either of both ends among said three containers is routed from a container located in a midst among said three containers through said insulating tube into a corresponding container located in either of both ends.

3. A switchgear installed in a main circuit from a power generator to a transformer and structured in a phase-separation configuration, comprising three containers arranged together;

a disconnecting switch having a breaker part disconnecting said main circuit electrically and insulated by an insulating gas, said breaker part arranged in each of said three containers, and a manipulator for making contact to and leaving from a contact maker of said breaker part;

plural instrumentation transformers for measuring a voltage of said main circuit, a switching part of a disconnecting switch and an earthing switch connected electrically to said main circuit and arranged in each of said three containers; and an arrester; wherein a couple of coadjacent containers among said three containers are linked by an insulating tube;

said plural instrumentation transformers are installed inside a container located in amidst among said three containers;

a primary-side lead line for an instrumentation transformer corresponding to a phase for a container located in either of both ends among said three containers is routed from a container located in a midst among said three containers through said insulating tube into a corresponding container located in either of both ends.

4. A switchgear claimed in either of claims 1 to 3, wherein a primary-side of said plural instrumentation transformers is configured with an open-delta connection method or a star connection method.

5. A switchgear claimed in either of claims 1 to 3, wherein the height of a container located in a midst among said three containers is higher than that of two other containers.

6. A switchgear claimed in either of claims 1 to 3, wherein said plural instrumentation transformers are supported so as to be suspended from a ceiling board installed above said container.

7. A switchgear claimed in claim 3, wherein said arrester is supported so as to be suspended from a ceiling board installed above said container.

* * * * *